United States Patent
Kim

(10) Patent No.: US 11,304,375 B2
(45) Date of Patent: Apr. 19, 2022

(54) ILLUMINATION DEVICE, PLANT STORAGE APPARATUS AND METHOD FOR HIGHER RETENTION OF PHYTOCHEMICAL CONTENT OF PLANT

(71) Applicant: Seoul Viosys Co., Ltd., Ansan-si (KR)

(72) Inventor: Se Ryung Kim, Ansan-si (KR)

(73) Assignee: Seoul Viosys Co., Ltd., Ansan-si (KR)

(*) Notice: Subject to any disclaimer, the term of this patent is extended or adjusted under 35 U.S.C. 154(b) by 373 days.

(21) Appl. No.: 16/265,210

(22) Filed: Feb. 1, 2019

(65) Prior Publication Data

US 2019/0289792 A1 Sep. 26, 2019

Related U.S. Application Data

(60) Provisional application No. 62/625,914, filed on Feb. 2, 2018.

(51) Int. Cl.
*A01G 7/04* (2006.01)
*A01G 9/24* (2006.01)
(Continued)

(52) U.S. Cl.
CPC ............. *A01G 7/045* (2013.01); *A01G 9/249* (2019.05); *A23B 7/015* (2013.01); *A23L 3/28* (2013.01); *H05B 47/115* (2020.01); *H05B 47/16* (2020.01)

(58) Field of Classification Search
CPC ........ A01G 7/045; A01G 9/249; H05B 47/16; H05B 47/115; A23L 3/28; A23L 3/363;
(Continued)

(56) References Cited

U.S. PATENT DOCUMENTS

2007/0151149 A1 7/2007 Karpinski
2015/0069270 A1* 3/2015 Shur .................. A23L 3/28
250/492.1
(Continued)

FOREIGN PATENT DOCUMENTS

CN 104126434 A * 11/2014
CN 107254387 A * 10/2017
(Continued)

OTHER PUBLICATIONS

Kobayashi, Hironori et al. "Environmental stress enhances biosynthesis of flavor precursors, S-3-(hexan-1-ol)-glutathione and S-3-(hexan-1-ol)-L-cysteine, in grapevine through glutathione S-transferase activation." Journal of experimental botany vol. 62,3 (2011): 1325-36. doi:10.1093/jxb/erq376 (Year: 2010).*
(Continued)

*Primary Examiner* — Renan Luque
(74) *Attorney, Agent, or Firm* — H.C. Park & Associates, PLC

(57) ABSTRACT

A plant storage apparatus for higher retention of phytochemical content of a plant including a storage unit having an inner space for storing the plant, an ultraviolet (UV) unit provided to the storage unit and configured to emit UV light when the inner space is sealed, and a control unit configured to control operation of the UV unit such that the plant stored in the storage unit is irradiated with UV light to retain a higher phytochemical content than a plant not irradiated with UV light.

18 Claims, 13 Drawing Sheets

(51) Int. Cl.
    *A23L 3/28*     (2006.01)
    *A23B 7/015*    (2006.01)
    *H05B 47/16*    (2020.01)
    *H05B 47/115*   (2020.01)

(58) Field of Classification Search
    CPC ....... A23B 7/015; A61L 2/10; A61L 2202/14;
        A61L 2202/21; F21V 9/06; F25D 17/042;
        F25D 2317/0417; F25D 2400/36; F25D
        27/005
    See application file for complete search history.

(56) References Cited

U.S. PATENT DOCUMENTS

2015/0165079 A1*  6/2015  Shur .................... F25D 17/042
                                                            250/455.11
    2015/0173379 A1*  6/2015  Lee ..................... A23B 7/015
                                                            700/90
    2018/0255710 A1*  9/2018  Urban .................. A01H 3/02
    2020/0107504 A1*  4/2020  Bongartz ............... F21V 21/34

FOREIGN PATENT DOCUMENTS

JP      07-270044       10/1995
    KR      20-0362989      9/2004
    WO      2004/103060     12/2004
    WO      2007/085842     8/2007

OTHER PUBLICATIONS

International Search Report dated May 17, 2019, in International Application No. PCT/KR2019/001434.

* cited by examiner

ILLUMINATION DEVICE, PLANT STORAGE APPARATUS AND METHOD FOR HIGHER RETENTION OF PHYTOCHEMICAL CONTENT OF PLANT

CROSS-REFERENCE TO RELATED APPLICATION

This application claims priority from and the benefit of U.S. Provisional Patent Application No. 62/625,914, filed on Feb. 2, 2018, which is hereby incorporated by reference for all purposes as if fully set forth herein.

BACKGROUND

Field

Exemplary embodiments of the disclosure relate generally to an apparatus and method for plant storage.

Discussion of the Background

Plants produce organic matter from carbon dioxide and water using light energy through photosynthesis. Plants use chemical energy of organic matter obtained through photosynthesis as nutrients for its growth and so on. Plants contain phytochemicals that have beneficial effects on a subject in need thereof.

However, the freshness and phytochemical content of plants gradually decrease from the harvest until being ingested by humans. Generally, plants are kept refrigerated to maintain their freshness. However, when left unattended for a certain period of time, plants kept under refrigeration are likely to be decomposed. In addition, while a refrigerated storage may delay decomposition of the plants, it cannot prevent reduction in phytochemical contents of the plants.

The above information disclosed in this Background section is only for understanding of the background of the inventive concepts, and, therefore, it may contain information that does not constitute prior art.

SUMMARY

Plant storage apparatus constructed according to exemplary implementations of the invention are capable of maintaining a high phytochemical content of a plant while preserving the plant.

Additional features of the inventive concepts will be set forth in the description which follows, and in part will be apparent from the description, or may be learned by practice of the inventive concepts.

A plant storage apparatus for higher retention of phytochemical content of a plant according to an exemplary embodiment includes a storage unit having an inner space for storing the plant, an ultraviolet (UV) unit provided to the storage unit and configured to emit UV light when the inner space is sealed, and a control unit configured to control operation of the UV unit such that the plant stored in the storage unit is irradiated with UV light to retain a higher phytochemical content than a plant not irradiated with UV light.

The control unit may be configured to control the UV unit to stop UV light radiation when the inner space of the storage unit is opened.

The plant storage apparatus may further include a timer configured to control a duration of UV light radiation from the UV unit.

A duration of UV light radiation may be at least 1.5 hours.

A phytochemical of the plant may be glutathione.

The duration of UV radiation may be at least 6 hours.

A phytochemical of the plant may be resveratrol.

The phytochemical content of the plant irradiated with UV light may be greater than that of a plant immediately after harvesting.

The phytochemical content of the plant irradiated with UV light may be at least 80% of that of the plant immediately after harvesting.

A plant storage method for causing a plant to have a higher retention of phytochemical content according to another exemplary embodiment includes irradiating the plant with ultraviolet (UV) light such that the plant has a higher phytochemical content than a plant not irradiated with UV light.

An illumination device according to yet another exemplary embodiment for irradiating a harvested plant with ultraviolet (UV) light to cause the harvested plant irradiated with UV light to retain more phytochemical contents than a harvested plant not irradiated with UV light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts

DETAILED DESCRIPTION

Figure 1:
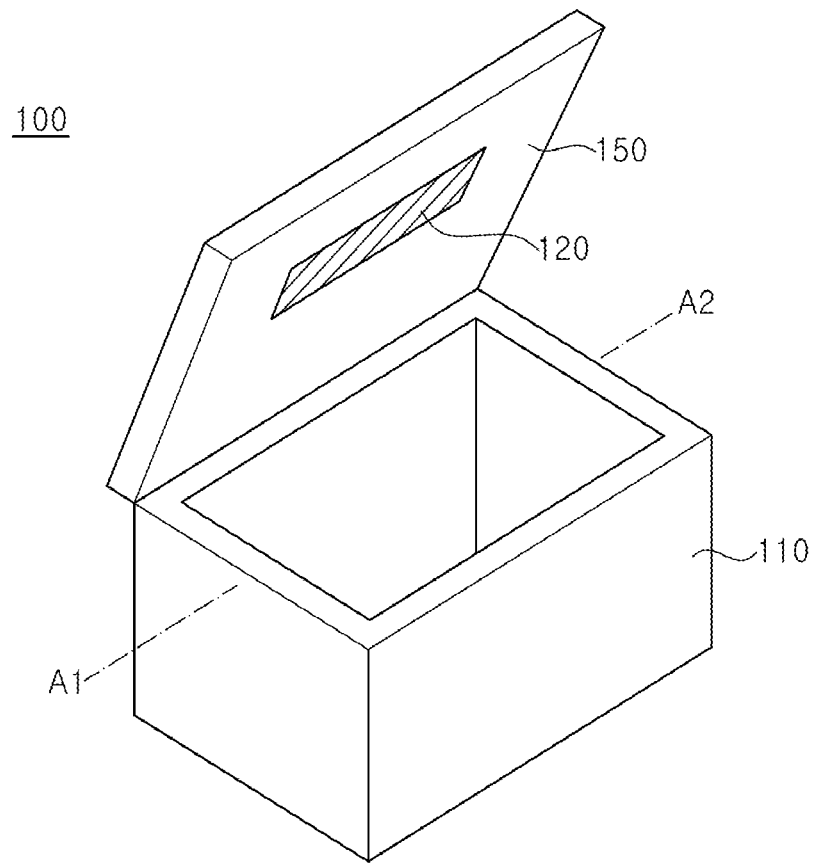
FIG. 1, FIG. 2, and FIG. 3 are schematic views of a plant storage apparatus according to exemplary embodiments.

In the following description, for the purposes of explanation, numerous specific details are set forth in order to provide a thorough understanding of various exemplary embodiments or implementations of implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the scope of the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the scope of the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules, such as control boards and control units. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, exemplary embodiments of the inventive concepts will be described with reference to the accompanying drawings.

Figure 2:
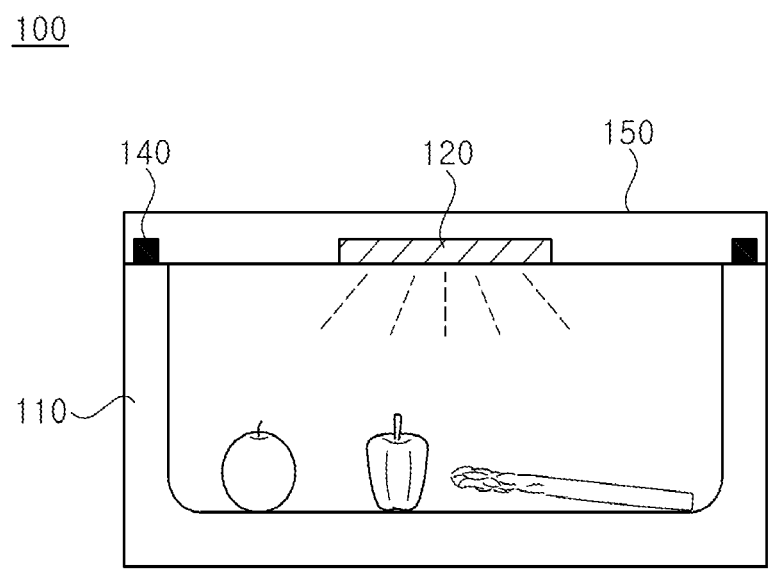
Figure 3:
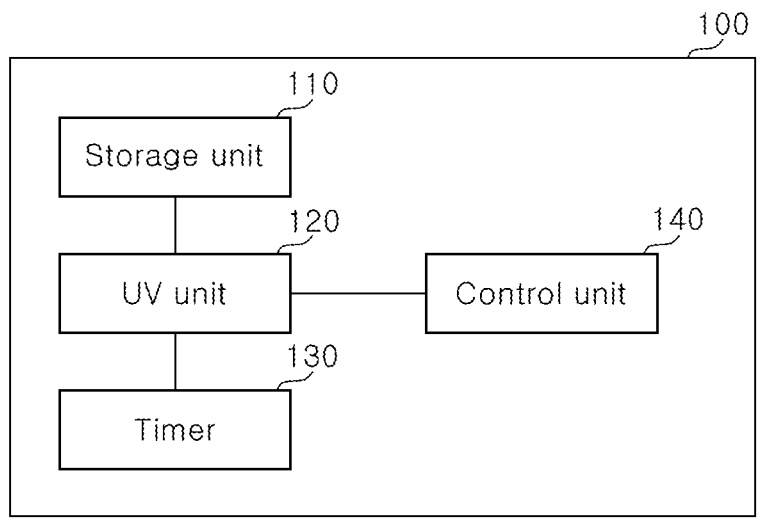

FIG. 1 to FIG. 3 are schematic views of a plant storage apparatus according to exemplary embodiments.

FIG. 1 is a schematic view of a plant storage apparatus according to an exemplary embodiment. FIG. 2 is a schematic cross-sectional view taken along line A1-A2 of FIG. 1. FIG. 3 is a block diagram of the plant storage apparatus according to an exemplary embodiment.

Referring to FIG. 1 to FIG. 3, the plant storage apparatus 100 includes a storage unit 110, a UV unit 120, a timer 130, and a control unit 140.

The storage unit 110 may be a housing having an inner space for storing plants. Alternatively, the storage unit 110 may be a part of a device for storing plants.

The UV unit 120 is provided to the storage unit 110 to emit UV light toward the inner space of the storage unit 110. The UV unit 120 may include a light source emitting UV light and a circuit board transmitting an electric signal to supply power to the light source. For example, the light source may be a light emitting diode including an n-type semiconductor layer, a p-type semiconductor layer, and an active layer. However, the inventive concepts are not limited thereto, and the UV unit 120 may include any light source capable of emitting UV light.

The control unit 140 controls operation of the UV unit 120 depending on whether the storage unit 110 is opened or closed (or sealed). For example, the control unit 140 may include a sensor for detecting whether a door 150 of the storage unit 110 is opened or closed. In some exemplary embodiments, the control unit 140 may include a sensor for detecting brightness of the inner space of the storage unit 110. In some exemplary embodiments, the control unit 140 may include one or more sensors for detecting whether the door 150 of the storage unit 110 is opened or closed, and for detecting the brightness of the inner space of the storage unit 110.

The control unit 140 may control the operation of the UV unit 120 to stop the UV light emission, when receiving a signal indicating that the storage unit 110 is opened. As such, the plant storage apparatus 100 can prevent the UV light escaping from the storage unit 110, thereby preventing a user from being exposed to the UV light.

The timer 130 controls the operation time of the UV unit 120. In particular, the timer 130 controls the UV unit 120 to emit UV light for a predetermined period of time.

In this case, a plant stored in the storage unit 110 is irradiated with UV light emitted from the UV unit 120. The plant can be kept fresh for a long period time through being irradiated with UV light. As such, the plant storage apparatus 100 can substantially prevent decomposition of the plant while suppressing reduction of phytochemical content of the plant.

Suppressing the reduction of phytochemical content of the plant provided by the plant storage apparatus 100 will be described below in more detail with reference to experimental results.

The plant storage apparatus 100 may further include an input unit for signal input. Accordingly, the control over duration of UV emission may be achieved by the timer 130 for a predetermined duration, and/or by a signal input through the input unit. In addition, the plant storage apparatus 100 may further include an output unit for signal output. The output unit may output various pieces of information, such as information regarding whether and how long the plant storage apparatus 100 will emit UV light.

As described above, the plant storage apparatus 100 includes the storage unit 110 for storing plants therein. In another exemplary embodiment, the storage unit 110 may be an inner space of an external device for storing plants. More particularly, the plant storage apparatus 100 may be implemented by providing the UV unit 120 to an external plant storage device. In this case, the UV unit 120 may be provided in an illumination device. In some exemplary embodiments, the plant storage apparatus 100 may be implemented by providing the UV unit 120 and the timer 130 to an external plant storage device.

Although FIGS. 1 and 2 show that the door 150 opens or closes the inner space of the storage unit 110, the inventive concepts are not limited thereto. In some exemplary embodiments, the door 150 may be omitted. Further, FIGS. 1 and 2 show that the UV unit 120 is mounted on the door 150, however, the inventive concepts are not limited to a particular location of the UV unit 120. For example, the UV unit 120 may be disposed at any location where the plant in the storage unit 110 can be irradiated with UV light from the UV unit 120.

FIG. 4 to FIG. 8 show results of experiments for measuring changes in phytochemical content in asparagus upon irradiation with UV light.

From among harvested asparaguses, uniform individuals were selected, followed by removal of a topmost portion of each of the selected individuals to which leaves were irregularly attached. Thereafter, the stem of the asparaguses was cut at intervals of 3 cm and then vertically cut into halves, thereby preparing a sample. In the experiments, the phytochemical content of the asparagus sample was measured immediately after the harvest, after storage under dark conditions, and after irradiation with UV light. Here, the phytochemical of the asparagus sample was glutathione. In addition, a control group was a group of asparagus samples stored under dark conditions, and a treatment group was a group of asparagus samples treated with UV light.

Figure 4:
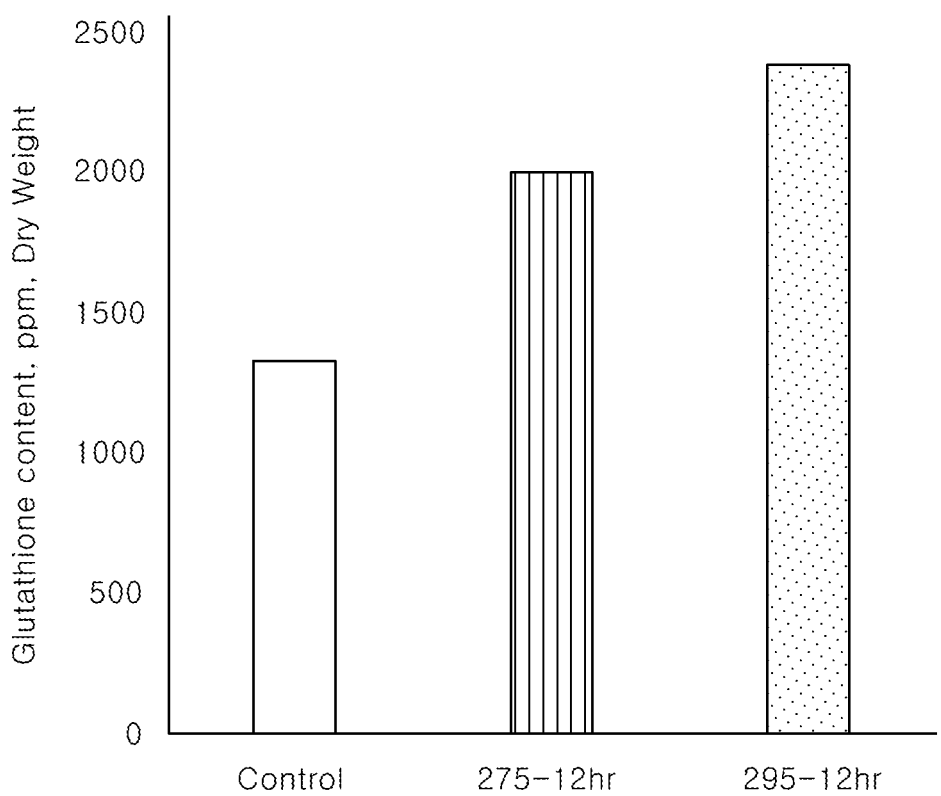
FIG. 4, FIG. 5, FIG. 6, FIG. 7, and FIG. 8 show results of experiments for measuring changes in phytochemical content of asparagus upon irradiation with UV light.

FIG. 4 shows results of a first experiment in which the phytochemical content of asparagus was measured after storage under dark conditions and after storage under UV treatment.

In the first experiment, the phytochemical content of asparagus was measured after storage for 48 hours at room temperature under dark conditions or under UV treatment. Here, room temperature refers to a temperature of 15° C. to 25° C.

In the first experiment, a control group was a group of asparagus samples stored for 48 hours under dark conditions, a first treatment group was a group of asparagus samples treated with UV light having a wavelength of 275 nm for 12 hours, and a second treatment group was a group of asparagus samples treated with UV light having a wavelength of 295 nm for 12 hours. Here, the intensity of UV light radiated to each treatment group was 10 µW/cm². Each of the first treatment group and the second treatment group was stored at room temperature for 36 hours after being treated with UV light for 12 hours.

FIG. 4 and Table 1 show results of the first experiment, in which the phytochemical content of each of the control group (Control), the first treatment group (275-12 hr), and the second treatment group (295-12 hr) was measured after storage for a total of 48 hours.

TABLE 1

Results of first experiment

| Control group | First treatment group (275 nm) | Second treatment group (295 nm) |
|---|---|---|
| 100% | 151% | 180% |

When the phytochemical content of the control group was given as 100%, the phytochemical content of the first treatment group was 51% higher than that of the control group, and the phytochemical content of the second treatment group was 80% higher than that of the control group.

Based on the results of the first experiment, it can be seen that, when stored under UV treatment, asparagus has a higher phytochemical content than when stored under dark conditions without the UV treatment.

Figure 5:
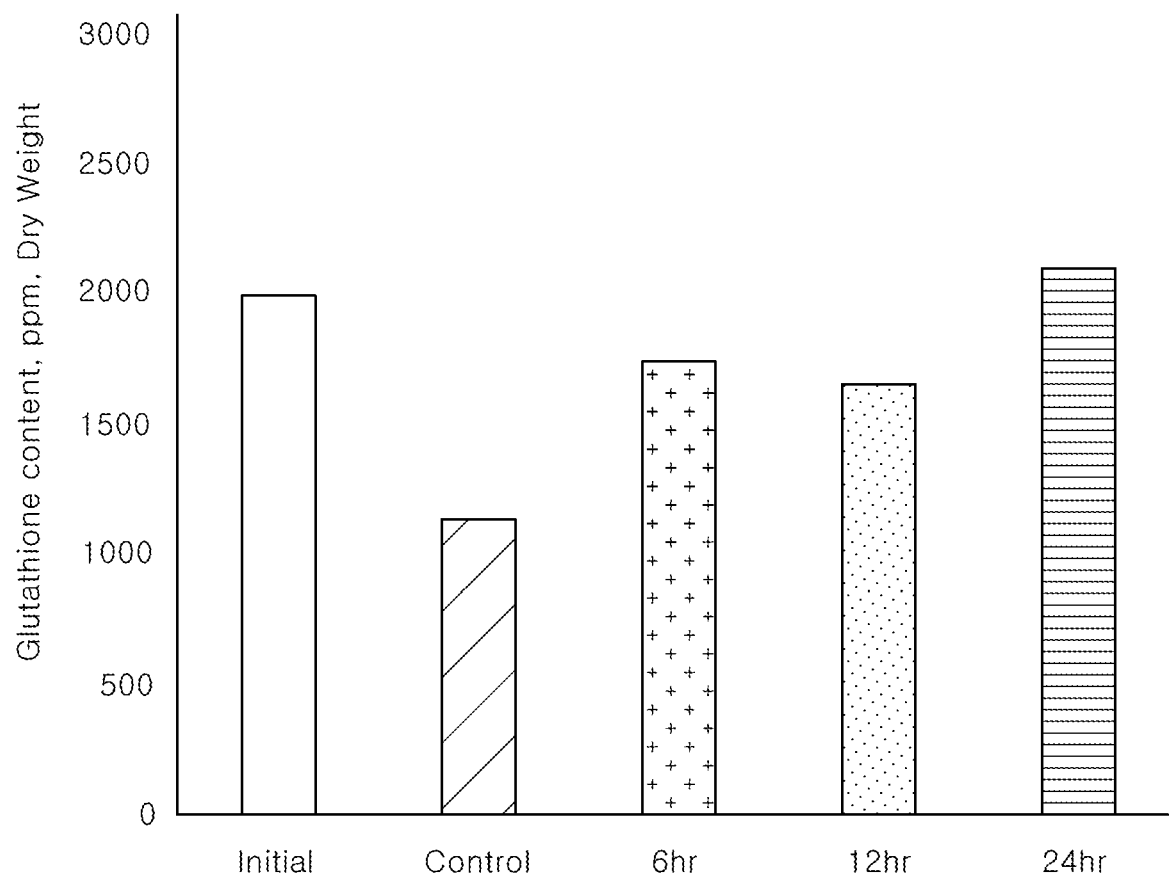

FIG. 5 shows results of a second experiment, in which the phytochemical content of asparagus was measured after storage under different conditions.

In the second experiment, a control group (Control) was a group of asparagus samples stored for 48 hours under dark conditions. In addition, a first treatment group (6 h) was a group of asparagus samples stored for 42 hours after being treated with UV light having a wavelength of 295 nm at room temperature for 6 hours. A second treatment group was group of asparagus samples stored for 36 hours after being treated with UV light having a wavelength of 295 nm at room temperature for 12 hours. A third treatment group was a group of asparagus samples stored for 24 hours after being treated with UV light having a wavelength of 295 nm at room temperature for 24 hours. Here, the intensity of UV light radiated to each treatment group was 10 µW/cm².

Table 2 shows results of the second experiment.

TABLE 2

Results of second experiment

|  | Immediately after harvest | Control group | First treatment group | Second treatment group | Third treatment group |
|---|---|---|---|---|---|
| Content (µg/g) | 1,984 | 1,132 | 1,751 | 1,654 | 2,098 |
| Rate of change 1 | — | 100% | 155% | 146% | 185% |
| Rate of change 2 | 100% | 57% | 88% | 83% | 106% |

In Table 2, the rate of change 1 denotes a percentage of the phytochemical content of each of the first to third treatment groups with respect to the phytochemical content of the control group. When the phytochemical content of the control group as measured after 48 hours from harvest is given as 100%, the phytochemical content of the first treatment group was 55% higher than that of the control group. In addition, the phytochemical content of the second treatment group was 46% higher than that of the control group, and the phytochemical content of the third treatment group was 85% higher than that of the control group.

In addition, the rate of change 2 denotes a percentage of the phytochemical content of each of the control group and the first to third treatment groups with respect to a phytochemical content of asparagus as measured immediately after the harvest (e.g., an initial phytochemical content). When the phytochemical content of asparagus as measured immediately after harvest was given as 100%, the phytochemical contents of the control group, the first treatment group, and the second treatment group were 57%, 88%, and 83%, respectively, which were lower than the initial phytochemical content. However, the phytochemical content of the third treatment group was 106%, which was higher than the initial phytochemical content.

In particular, the phytochemical content of the control group was lower than the initial phytochemical content. However, it can be seen that the phytochemical content of each of the first treatment group (6 hr), the second treatment group (12 hr), and the third treatment group (24 hr) did not significantly change as compared with the initial phytochemical content.

From the results of the second experiment, it can be seen that, when stored under UV treatment, asparagus has a higher phytochemical content than when stored without UV treatment. In addition, it can be seen that asparagus treated with UV light has a similar or even higher phytochemical content as compared to that of the just-harvested asparagus.

Figure 6:
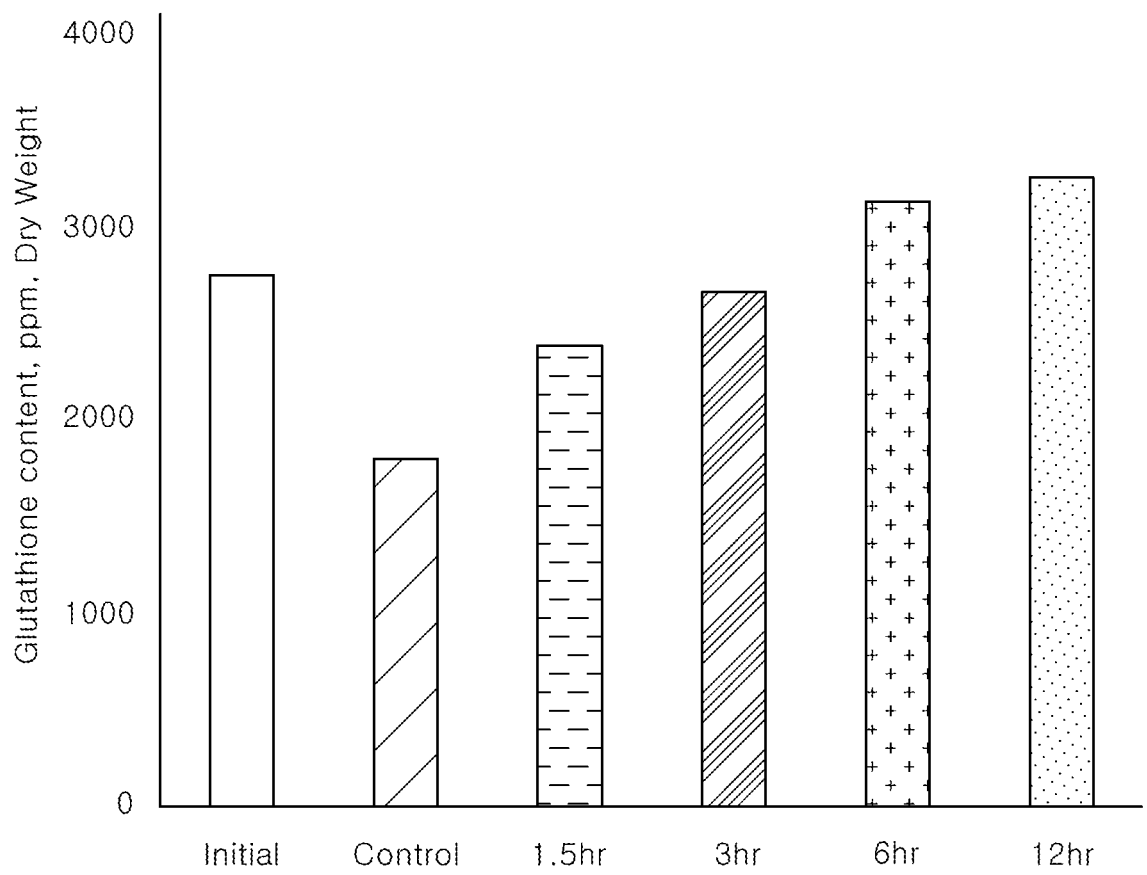

FIG. 6 shows results of a third experiment, in which the phytochemical content of asparagus was measured after storage under different conditions.

In the third experiment, a control group (Control) was a group of asparagus samples stored for 48 hours under dark conditions. A first treatment group (1.5 h) was a group of asparagus samples stored for 46.5 hours after being treated with UV light having a wavelength of 295 nm at room temperature for 1.5 hours. A second treatment group (3 hr) was a group of asparagus samples stored for 45 hours after being treated with UV light having a wavelength of 295 nm at room temperature for 3 hours. A third treatment group (6 hr) was a group of asparagus samples stored for 42 hours after being treated with UV light having a wavelength of 295 nm at room temperature for 6 hours. A fourth treatment group (12 hr) was a group of asparagus samples stored for 36 hours after being treated with UV light having a wavelength of 295 nm at room temperature for 12 hours. Here, the intensity of UV light radiated to each treatment group was 10 µW/cm².

TABLE 3

Results of the third experiment

|  | Immediately after harvest | Control group | First treatment group | Second treatment group | Third treatment group | Fourth treatment group |
|---|---|---|---|---|---|---|
| Content (µg/g) | 2,735 | 1,812 | 2,385 | 2,657 | 3,130 | 3,248 |
| Rate of change 1 | — | 100% | 132% | 147% | 173% | 179% |

TABLE 3-continued

Results of the third experiment

|  | Immediately after harvest | Control group | First treatment group | Second treatment group | Third treatment group | Fourth treatment group |
|---|---|---|---|---|---|---|
| Rate of change 2 | 100% | 66% | 87% | 97% | 114% | 119% |

In Table 3, the rate of change 1 denotes a percentage of the phytochemical content of each of the first to fourth treatment groups with respect to the phytochemical content of the control group. In addition, the rate of change 2 denotes a percentage of the phytochemical content of each of the control group and the first to fourth treatment groups with respect to a phytochemical content of asparagus as measured immediately after harvest (e.g., an initial phytochemical content).

Referring to FIG. 6 and Table 3, the first treatment group (1.5 hr) had a 32% higher phytochemical content than the control group (Control) and the second treatment group (3 hr) had a 47% higher phytochemical content than the control group (Control). In addition, the third treatment group (6 hr) had a 73% higher phytochemical content than the control group (Control) and the fourth treatment group (12 hr) had a 79% higher phytochemical content than the control group (Control). That is, all of the first to fourth treatment groups, which were treated with UV light, had a higher phytochemical content than the control group not treated with UV light.

Further, it can be seen that the phytochemical content of the control group (Control) was significantly lower than the initial phytochemical content (the phytochemical content to asparagus immediately after harvested). Moreover, it can be seen that the phytochemical content of the first treatment group (1.5 hr) to the fourth treatment group (12 hr) was similar or even higher than the initial phytochemical content. Specifically, the phytochemical content of the first to fourth treatment groups was maintained at a level of at least 80% of the initial phytochemical content. Furthermore, the phytochemical content of the fourth treatment group significantly increased by 19%, as compared with the initial phytochemical content.

From the results of the third experiment, it can be seen that UV treatment of asparagus can suppress reduction in phytochemical content relative to an initial value as measured immediately after harvest.

Figure 7:
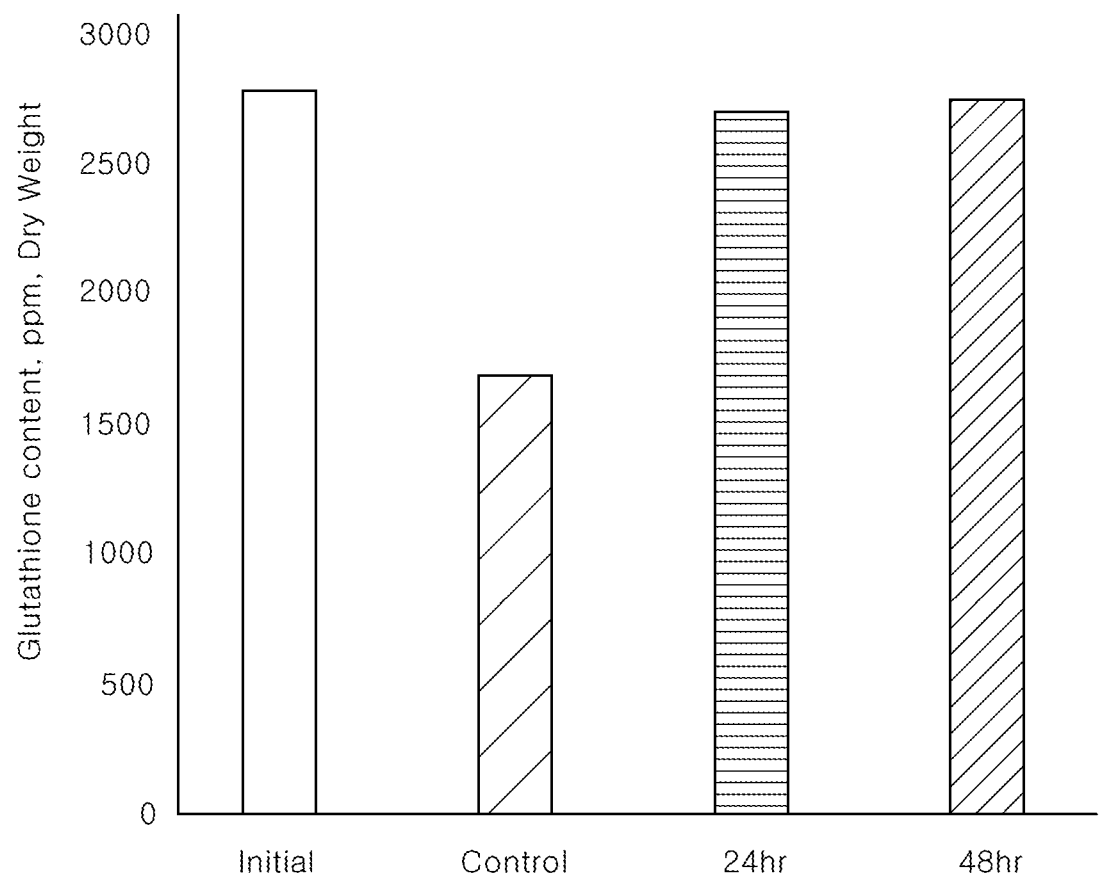

FIG. 7 shows results of a fourth experiment in which the phytochemical content of asparagus was measured after storage under different conditions.

In the fourth experiment, a control group was a group of asparagus samples stored at room temperature for 48 hours under dark conditions. A first treatment group was a group of asparagus samples stored for 24 hours after being treated with UV light having a wavelength of 295 nm at room temperature for 24 hours. A second treatment group was a group of asparagus samples treated with UV light having a wavelength of 295 nm at room temperature for 48 hours. Here, the intensity of UV light radiated to the first treatment group was 10 $\mu W/cm^2$. And the intensity of UV light radiated to the second treatment group was 20 $\mu W/cm^2$.

Referring to FIG. 7, the phytochemical content of the control group (Control) was lower than the phytochemical content of asparagus as measured immediately after harvest (e.g., an initial phytochemical content), and the phytochemical content of both the first treatment group (24 hr with 10 $\mu W/cm^2$) and the second treatment group (48 hr with 20 $\mu W/cm^2$) were similar to the initial phytochemical content. In addition, it can be seen that the first and second treatment groups, which were treated with UV light, had a higher phytochemical content than the control group, which was not treated with UV light.

TABLE 4

Results of fourth experiment

| Control group | First treatment group | Second treatment group |
|---|---|---|
| 100% | 164% | 167% |

Referring to Table 4, when the phytochemical content of the control group as measured after 48 hours from harvest was given as 100%, the first treatment group had a 64% higher phytochemical content than the control group. In addition, the second treatment group had a 67% higher phytochemical content than the control group.

Referring to FIG. 7, although both the first treatment group and the second treatment group had a lower phytochemical content than just-harvested asparagus, there was no significant difference in phytochemical content between each of the first treatment group and the second treatment group and the just-harvested asparagus.

From the results of the second to fourth experiments shown in FIG. 5 to FIG. 7, it can be seen that, when asparagus is treated with UV light for 1.5 hours or more, the phytochemical content of the asparagus can be maintained at least about 80% level of the phytochemical content of the just-harvested asparagus. In addition, it can be seen that, when asparagus is treated with UV light for 24 hours or more, the phytochemical content of asparagus can be maintained at a level similar to the phytochemical content of the just-harvested asparagus.

Figure 8:
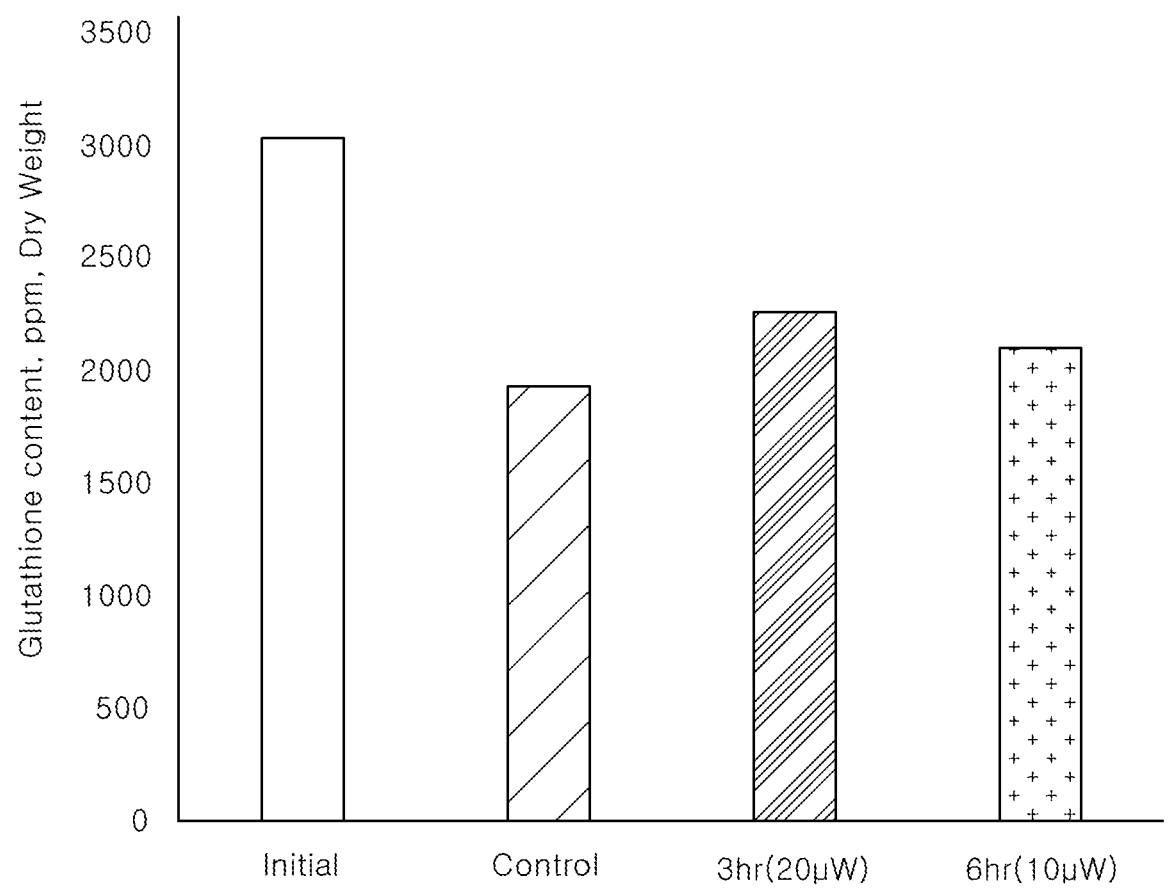

FIG. 8 shows results of a fifth experiment, in which the phytochemical content of asparagus was measured after storage under different conditions.

In the fifth experiment, a control group was a group of asparagus samples kept refrigerated for 24 hours after being stored at room temperature for 24 hours under dark conditions. A first treatment group was a group of asparagus samples kept refrigerated for 24 hours after stored at room temperature for 21 hours after being treated with UV light having a wavelength of 275 nm and an intensity of 20 $\mu W/cm^2$ at room temperature for 3 hours. A second treatment group was a group of asparagus samples kept refrigerated for 24 hours after stored at room temperature for 18 hours after being treated with UV light having a wavelength of 275 nm and an intensity of 10 $\mu W/cm^2$ at room temperature for 6 hours. Here, the room temperature was 15° C. to 25° C. and the refrigeration temperature was 1° C. to 5° C. Further, the total accumulated doses of UV radiation for the first treatment group and the second treatment group had substantially the same value.

In Table 5, the rate of change 1 denotes a percentage of the phytochemical content of each of the first treatment group and the second treatment group with respect to the phytochemical content of the control group. In addition, the rate of change 2 denotes a percentage of the phytochemical content of each of the control group and the first and second treatment groups with respect to a phytochemical content of asparagus as measured immediately after harvest (e.g., an initial phytochemical content).

TABLE 5

Results of fifth experiment

|  | Immediately after harvest | Control group | First treatment group | Second treatment group |
|---|---|---|---|---|
| Content (μg/g) | 3,031 | 1,930 | 2,264 | 2,103 |
| Rate of change 1 | — | 100% | 117% | 109% |
| Rate of change 2 | 100% | 64% | 75% | 69% |

Referring to FIG. 8 and Table 5, the phytochemical content of the second treatment group was lower than the initial phytochemical content, and was similar to that of the control group (Control). However, the phytochemical content of the first treatment group was significantly higher than that of the control group, despite being lower than the initial phytochemical content.

FIG. 9 to FIG. 14 show results of experiments, in which changes in phytochemical content of a peanut sprout upon irradiation with UV light were measured.

From among harvested peanut sprouts, uniform individuals were selected, followed by measurement of the phytochemical content of the selected individuals immediately after the harvest, after storage under dark conditions, and after irradiation with UV light. Here, a phytochemical of a peanut sprout measured in the experiments was resveratrol. In addition, a control group was a group of peanut sprout samples stored under dark conditions and a treatment group was a group of peanut sprout samples treated with UV light.

Figure 9:
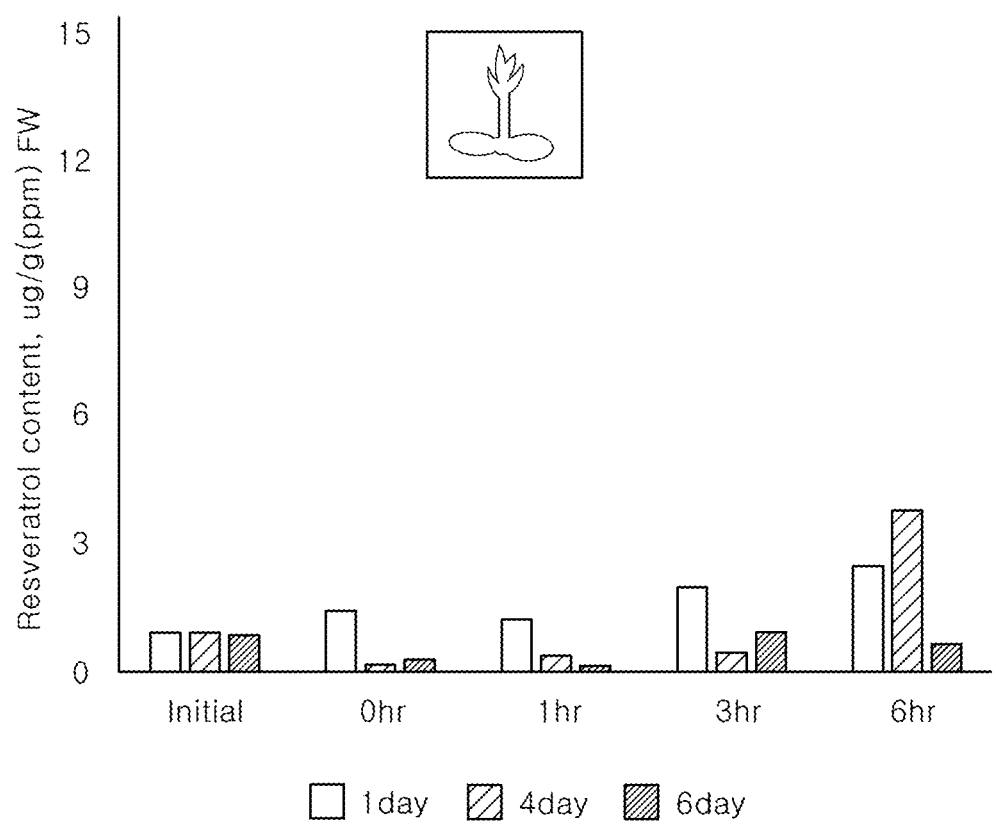
FIG. 9, FIG. 10, FIG. 11, FIG. 12, FIG. 13, and FIG. 14 show results of experiments for measuring changes in phytochemical content of a peanut sprout upon irradiation with UV light.

FIG. 9 shows results of a sixth experiment, in which the phytochemical content of a peanut sprout was measured after storage under different conditions.

In the sixth experiment, the phytochemical content of a peanut sprout was measured at an upper end thereof including leaves.

In the sixth experiment, a control group (0 hr) was a group of peanut sprout samples stored under dark conditions. Specifically, a first control group was a group of peanut sprout samples stored at room temperature for 24 hours. That is, the first control group was a group of peanut sprout samples stored for a total of 1 day. A second control group was a group of peanut sprout samples kept refrigerated for 72 hours after being stored at room temperature for 24 hours. That is, the second control group was a group of peanut sprout samples stored for a total of 4 days. A third control group was a group of peanut sprout samples kept refrigerated for 120 hours after being stored at room temperature for 24 hours. That is, the third control group was a group of peanut sprout samples stored for a total of 6 days.

A first treatment group (1 hr) was a group of peanut sprout samples treated with UV light for 1 hour after harvest, and was divided into a 1-$1^{st}$ treatment group, a 1-$2^{nd}$ treatment group, and a 1-$3^{rd}$ treatment group according to the total duration of storage.

More specifically, the 1-$1^{st}$ treatment group was a group of peanut sprout samples stored at room temperature for 24 hours, the 1-$2^{nd}$ treatment group was a group of peanut sprout samples kept refrigerated for 72 hours after being stored at room temperature for 24 hours, and the 1-$3^{rd}$ treatment group was a group of peanut sprout samples kept refrigerated for 120 hours after being stored at room temperature for 24 hours.

A second treatment group (3 hr) was a group of peanut sprout samples treated with UV light for 3 hours after harvest and was divided into a 2-$1^{st}$ treatment group, a 2-$2^{nd}$ treatment group, and a 2-$3^{rd}$ treatment group according to the total duration of storage.

More specifically, the 2-$1^{st}$ treatment group was a group of peanut sprout samples stored at room temperature for 24 hours after harvest, the 2-$2^{nd}$ treatment group was a group of peanut sprout samples kept refrigerated for 72 hours after being stored at room temperature for 24 hours, and the 2-$3^{rd}$ treatment group was a group of peanut sprout samples kept refrigerated for 120 hours after being stored at room temperature for 24 hours.

A third treatment group (6 hr) was a group of peanut sprout samples treated with UV light for 6 hours after harvest and was divided into a 3-$1^{st}$ treatment group, a 3-$2^{nd}$ treatment group, and a 3-$3^{rd}$ treatment group according to the total duration of storage.

More specifically, the 3-$1^{st}$ treatment group was a group of peanut sprout samples stored at room temperature for 24 hours after harvest, the 3-$2^{nd}$ treatment group was a group of peanut sprout samples kept refrigerated for 72 hours after being stored at room temperature for 24 hours, and the 3-$3^{rd}$ treatment group was a group of peanut sprout samples kept refrigerated for 120 hours after being stored at room temperature for 24 hours.

Here, UV treatment was initiated simultaneously with storage at room temperature after harvest. In addition, for UV treatment, UV light having a wavelength of 295 nm was used.

In Table 6, the rate of change 1 denotes a percentage of the phytochemical content of each of the first to third treatment groups with respect to the phytochemical content of the control group. In addition, the rate of change 2 denotes a percentage of the phytochemical content of each of the control group and the first to third treatment groups with respect to a phytochemical content of peanut sprouts as measured immediately after harvest (e.g., an initial phytochemical content).

TABLE 6

Results of sixth experiment

| Sixth experiment (upper end) | | | Immediately after harvest | Duration of UV treatment | | | |
|---|---|---|---|---|---|---|---|
| | | | | 0 hour | 1 hours | 3 hours | 6 hours |
| Duration of storage | 1 day | Rate of change 1 | — | 100% | No change | No change | No change |
| | | Rate of change 2 | 100% | No change | No change | No change | No change |

TABLE 6-continued

Results of sixth experiment

| Sixth experiment (upper end) | | Immediately after harvest | Duration of UV treatment | | | |
|---|---|---|---|---|---|---|
| | | | 0 hour | 1 hours | 3 hours | 6 hours |
| 4 days | Rate of change 1 | — | 100% | No change | No change | 12196% |
| | Rate of change 2 | 100% | No change | No change | No change | 430% |
| 6 days | Rate of change 1 | — | 100% | No change | No change | No change |
| | Rate of change 2 | 100% | No change | No change | No change | No change |

Referring to FIG. 9 and Table 6, it can be seen that the first treatment groups treated with UV light for 1 hour did not have a significantly higher phytochemical content than the control groups. In addition, the second treatment groups treated with UV light for 3 hours did not have a significantly higher phytochemical content than the control groups. Further, among the third treatment groups treated with UV light for 6 hours, the 3-$1^{st}$ and 3-$3^{rd}$ treatment groups did not also have a significantly higher phytochemical content than the control groups. However, the 3-$2^{nd}$ treatment group had a significantly higher phytochemical content than the second control group. Moreover, the phytochemical content of the 3-2nd treatment group was also higher than the initial phytochemical content.

Figure 10:
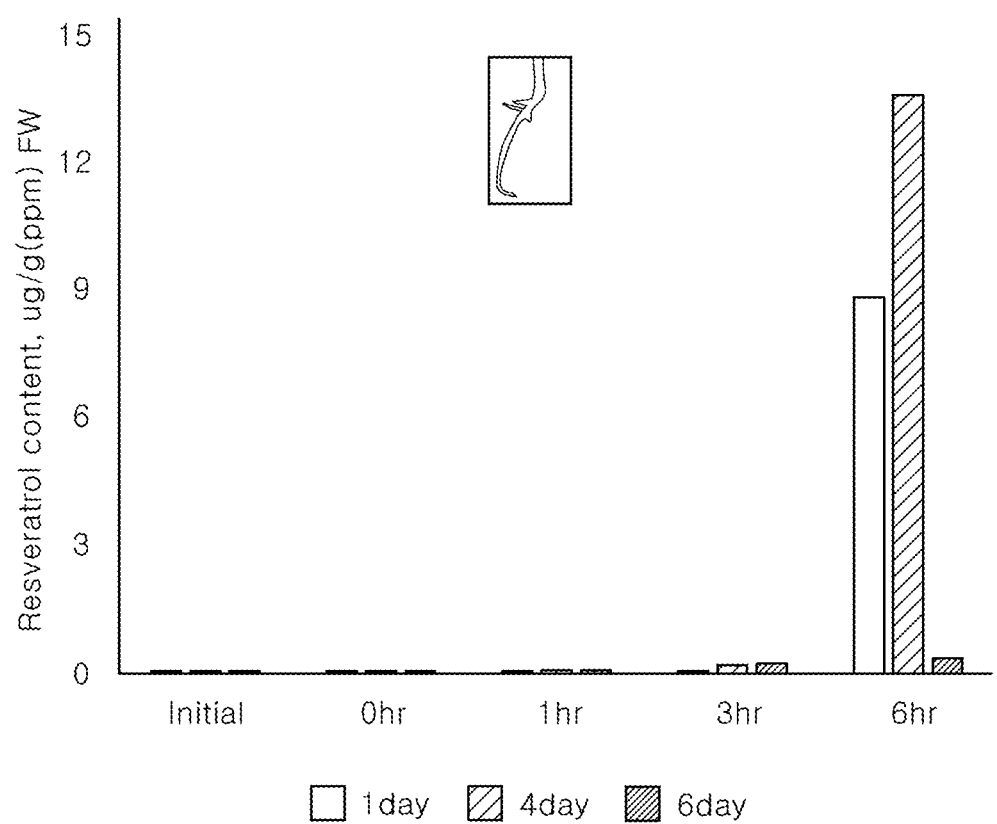

FIG. 10 shows results of a seventh experiment, in which the phytochemical content of a peanut sprout was measured after storage under different conditions.

In the seventh experiment, the phytochemical content of a peanut sprout was measured at a lower end thereof including roots.

In the seventh experiment, control groups and treatment groups are the same as those in the sixth experiment.

TABLE 7

Results of seventh experiment

| Seventh experiment (lower end) | | | Immediately after harvest | Duration of UV treatment | | | |
|---|---|---|---|---|---|---|---|
| | | | | 0 hour | 1 hour | 3 hours | 6 hours |
| Duration of storage | 1 day | Rate of change 1 | — | 100% | No change | No change | 24472% |
| | | Rate of change 2 | 100% | No change | No change | No change | 162747% |
| | 4 days | Rate of change 1 | — | 100% | No change | No change | 76870% |
| | | Rate of change 2 | 100% | No change | No change | No change | 251559% |
| | 6 days | Rate of change 1 | — | 100% | No change | No change | No change |
| | | Rate of change 2 | 100% | No change | No change | No change | No change |

Referring to FIG. 10 and Table 7, it can be seen that the first treatment groups treated with UV light for 1 hour did not have a significantly higher phytochemical content than the control groups. In addition, the second treatment groups treated with UV light for 3 hours did not have a significantly higher phytochemical content than the control groups. Further, among the third treatment groups treated with UV light for 6 hours, the 3-$3^{rd}$ treatment group did not have a significantly higher phytochemical content than the third control group. However, among the treatment groups treated with UV light for 6 hours, the 3-$1^{st}$ treatment group and 3-$2^{nd}$ treatment group had a significantly higher phytochemical content than the first control group and the second control group respectively. Moreover, both the 3-$1^{st}$ and 3-$2^{nd}$ treatment groups had a higher phytochemical content than just-harvested peanut sprouts.

Referring to FIG. 9 and FIG. 10, it can be seen that, when stored for 4 days while being irradiated with UV light for 6 hours, the upper and lower ends of a peanut sprout can retain a high phytochemical content.

Figure 11:
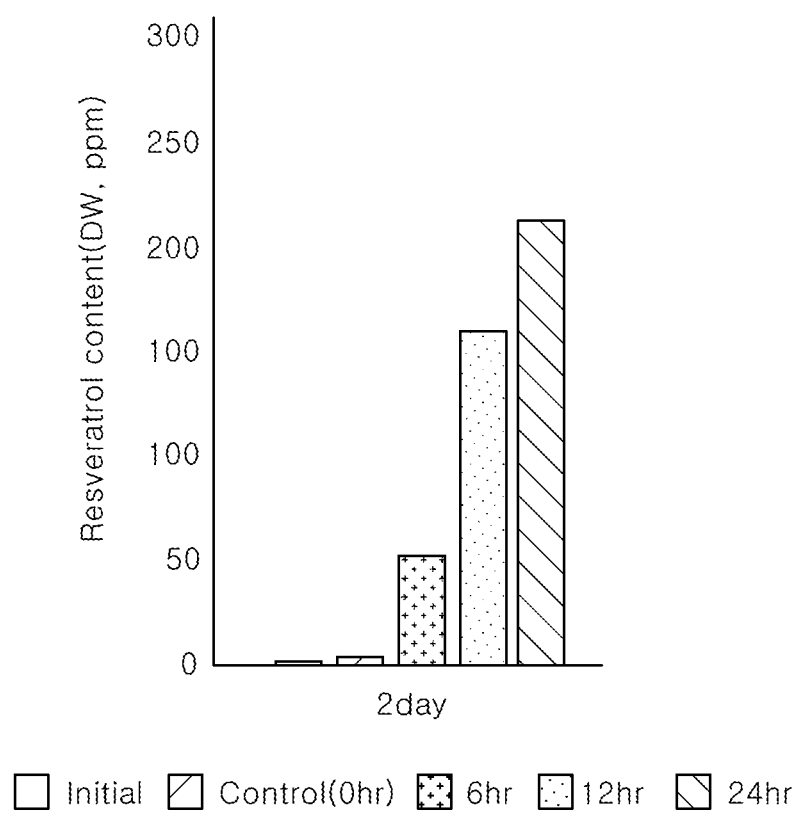
Figure 12:
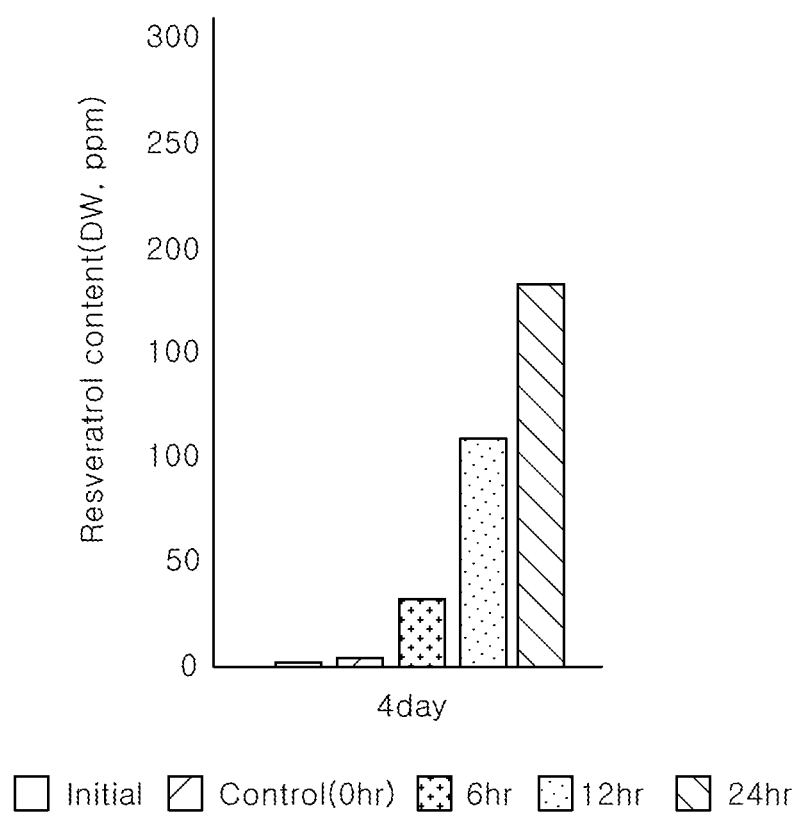

FIG. 11 and FIG. 12 show results of an eighth experiment in which the phytochemical content of a peanut sprout was measured after storage under different conditions.

In the eighth experiment, the phytochemical content of a peanut sprout was measured.

A control group (Control) was a group of peanut sprout samples stored under dark conditions. Specifically, a first control group shown in FIG. 11 was a group of peanut sprout samples kept refrigerated for 24 hours after being stored at room temperature for 24 hours. That is, the first control group was a group of peanut sprout samples stored for 2 days. A second control group shown in FIG. 12 was a group of peanut sprout samples kept refrigerated for 72 hours after being stored at room temperature for 24 hours. That is, the second control group was a group of peanut sprout samples stored for 4 days.

A first treatment group (6 hr) was a group of peanut sprout samples treated with UV light for 6 hours after harvest and was divided into a 1-$1^{st}$ treatment group as shown in FIG. 11 and a 1-$2^{nd}$ treatment group as shown in FIG. 12 according to the total duration of storage. Specifically, the 1-$1^{st}$ treatment group was a group of peanut sprout samples kept refrigerated for 24 hours after being stored at room temperature for 24 hours. The 1-$2^{nd}$ treatment group was a group of peanut sprout samples kept refrigerated for 72 hours after being stored at room temperature for 24 hours.

A second treatment group (12 hr) was a group of peanut sprout samples treated with UV light for 12 hours after harvest and was divided into a 2-$1^{st}$ treatment group as shown in FIG. 11 and a 2-$2^{nd}$ treatment group as shown in FIG. 12 according to the total duration of storage. Specifically, the 2-$1^{st}$ treatment group was a group of peanut sprout samples kept refrigerated for 24 hours after being stored at room temperature for 24 hours. The 2-$2^{nd}$ treatment group was a group of peanut sprout samples kept refrigerated for 72 hours after being stored at room temperature for 24 hours.

A third treatment group (24 hr) was a group of peanut sprout samples treated with UV light for 24 hours after harvest and was divided into a 3-$1^{st}$ treatment group as shown in FIG. 11 and a 3-$2^{nd}$ treatment group as shown in FIG. 12 according to the total duration of storage. Specifically, the 3-$1^{st}$ treatment group was a group of peanut sprout samples kept refrigerated for 24 hours after being stored at room temperature for 24 hours. The 3-$2^{nd}$ treatment group was a group of peanut sprout samples kept refrigerated for 72 hours after being stored at room temperature for 24 hours.

Here, UV treatment was initiated simultaneously with storage at room temperature after harvest. That is, the third treatment group was a group of peanut sprout samples continuously subjected to UV treatment during storage at room temperature for 24 hours.

FIG. 11 shows results of the eighth experiment when peanut sprout samples were stored for 2 days. FIG. 12 shows results of the eighth experiment when peanut sprout samples were stored for 4 days.

In the eighth experiment, for UV treatment, UV light having a wavelength of 275 nm was used.

In Table 8, the rate of change 1 denotes a percentage of the phytochemical content of each of the first to third treatment groups with respect to the phytochemical content of the control group. In addition, the rate of change 2 denotes a percentage of the phytochemical content of each of the control group and the first to third treatment groups with respect to a phytochemical content of peanut sprouts as measured immediately after harvest (e.g., an initial phytochemical content).

TABLE 8

| | | | Results of eighth experiment | | | | |
|---|---|---|---|---|---|---|---|
| | | | | Immediately | Duration of UV treatment | | |
| Eighth experiment | | | after harvest | 0 hour | 6 hours | 12 hours | 24 hours |
| Duration of storage | 2 days | Rate of change 1 | — | 100% | 1985% | 6045% | 8056% |
| | | Rate of change 2 | 100% | 1431% | 28404% | 86483% | 115251% |
| | 4 days | Rate of change 1 | — | 100% | 1841% | 6327% | 10647% |
| | | Rate of change 2 | 100% | 301% | 5541% | 19046% | 32049% |

Referring to FIG. 11, FIG. 12, and Table 8, it can be seen that the treatment groups treated with UV light for 6 hours, 12 hours, and 24 hours had higher phytochemical contents than the control groups, regardless of duration of storage.

In addition, it can be seen that the rate of increase in phytochemical content of the first to third treatment groups with respect to an initial value as measured immediately after harvest was significantly higher than the rate of increase in phytochemical content of the control group relative to the initial value.

More particularly, peanut sprout samples stored for a total of 2 days while being irradiated with UV light having a wavelength of 275 nm for 24 hours had the highest phytochemical content.

Figure 13:
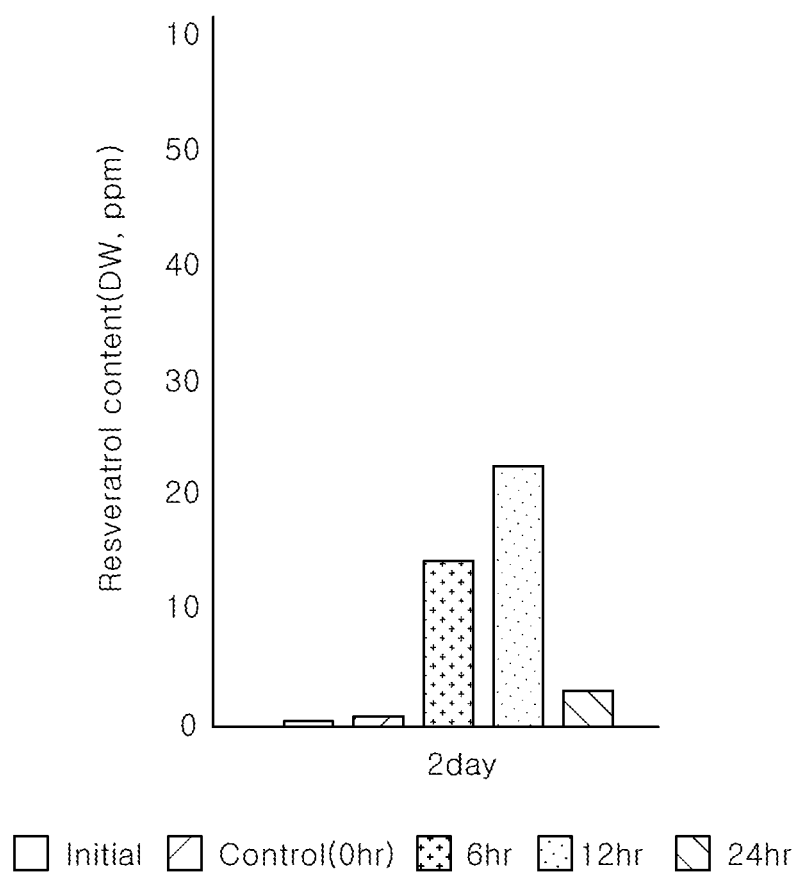
Figure 14:
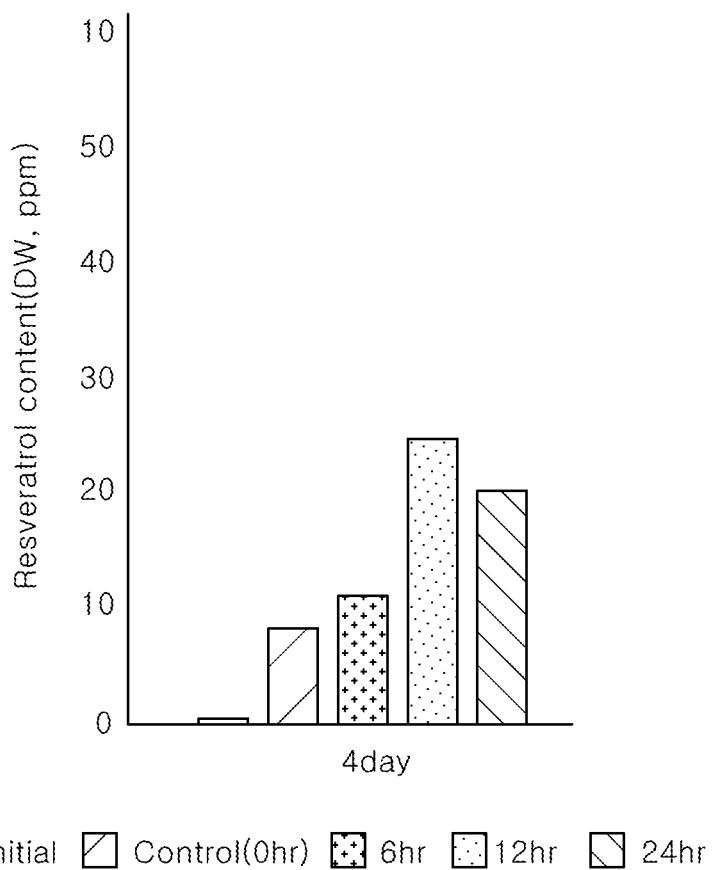

FIG. 13 and FIG. 14 show results of a ninth experiment in which the phytochemical content of a peanut sprout was measured after storage under different conditions.

In the ninth experiment, the phytochemical content of a peanut sprout was measured. The ninth experiment was conducted under the same conditions as in the eighth experiment except for the wavelength of UV light. In the ninth experiment, for UV treatment, UV light having a wavelength of 295 nm was used.

FIG. 13 shows results of the ninth experiment when peanut sprout samples were stored for 2 days. FIG. 14 shows results of the ninth experiment when peanut sprout samples were stored for 4 days.

In Table 9, the rate of change 1 denotes a percentage of the phytochemical content of each of the first to third treatment groups with respect to the phytochemical content of the control group. In addition, the rate of change 2 denotes a percentage of the phytochemical content of each of the control group and the first to third treatment groups with respect to a phytochemical content of peanut sprouts as measured immediately after harvest (e.g., an initial phytochemical content).

TABLE 9

Results of ninth experiment

| Ninth experiment | | | Immediately after harvest | Duration of UV treatment | | | |
|---|---|---|---|---|---|---|---|
| | | | | 0 hour | 6 hours | 12 hours | 24 hours |
| Duration of storage | 2 days | Rate of change 1 | — | 100% | 2594% | 4170% | 494% |
| | | Rate of change 2 | 100% | 622% | 16132% | 25932% | 3073% |
| | 4 days | Rate of change 1 | — | 100% | 135% | 307% | 248% |
| | | Rate of change 2 | 100% | 9927% | 13366% | 30515% | 24617% |

Referring to FIG. 13, FIG. 14, and Table 9, it can be seen that the treatment groups treated with UV light for 6 hours, 12 hours, and 24 hours had higher phytochemical contents than the control groups, regardless of duration of storage.

In addition, it can be seen that the rate of increase in phytochemical content of the first to third treatment groups with respect to an initial value as measured immediately after harvest was significantly higher than the rate of increase in phytochemical content of the control group with respect to the initial value.

More particularly, peanut sprout samples irradiated with UV light having a wavelength of 295 nm for 12 hours had a considerably high phytochemical content.

FIG. 4 to FIG. 8 show experimental results using asparagus and FIG. 9 to FIG. 14 show experimental results using a peanut sprout.

For both asparagus and a peanut sprout, treatment groups irradiated with UV light had higher phytochemical contents than corresponding control groups. More particularly, from the results shown in FIG. 4 to FIG. 14, it can be seen that, when treated with UV light during storage, plants can retain a higher phytochemical content than when stored without UV treatment. Further, it can be seen that the phytochemical content of plants subjected to UV treatment during storage can be higher than an initial value as measured immediately after harvest.

For asparagus, even when the duration of storage was 2 days, treatment groups irradiated with UV light for 1.5 hours or more retained higher phytochemical contents than corresponding control groups.

For a peanut sprout, even when the duration of storage was 2 days or more, treatment groups irradiated with UV light for 3 hours or more retained higher phytochemical contents than corresponding control groups.

For both asparagus and a peanut sprout, particularly, treatment groups irradiated with UV light for 6 hours or more had higher phytochemical contents than corresponding control groups. In addition, for both asparagus and a peanut sprout, even when the duration of storage was 2 days or more, treatment groups irradiated with UV light for 6 hours had higher phytochemical contents than corresponding control groups.

As such, from the experimental results using different species of plants, such as an asparagus and a peanut sprout, it can be seen that, when irradiated with UV light, plants have a less reduction in phytochemical content than otherwise. More particularly, it can be seen that, for a variety of plants, UV treatment for 6 hours or more can maintain the phytochemical content of the plants at a high level.

Accordingly, the plant storage apparatus 100 according to exemplary embodiments may have a predetermined duration of UV emission of 3 hours or more. More particularly, the plant storage apparatus 100 may allow plants stored in the storage unit 110 to be irradiated with UV light for 6 hours or more. In addition, through UV treatment for 6 hours or more, the plant storage apparatus 100 can allow the plants to retain a high phytochemical content, as in the experimental results described with reference to FIG. 4 to FIG. 14. For example, the plant storage apparatus 100 may be installed on a shelf or stand for the storage or display of plants. In some exemplary embodiments, the plant storage apparatus 100 may be provided as a shelf or stand itself for the display of plants. In some exemplary embodiments, the plant storage apparatus 100 may be an independent apparatus for storing plants, or may be installed in a refrigerator or in a separate space of a refrigerator.

Figure 15:
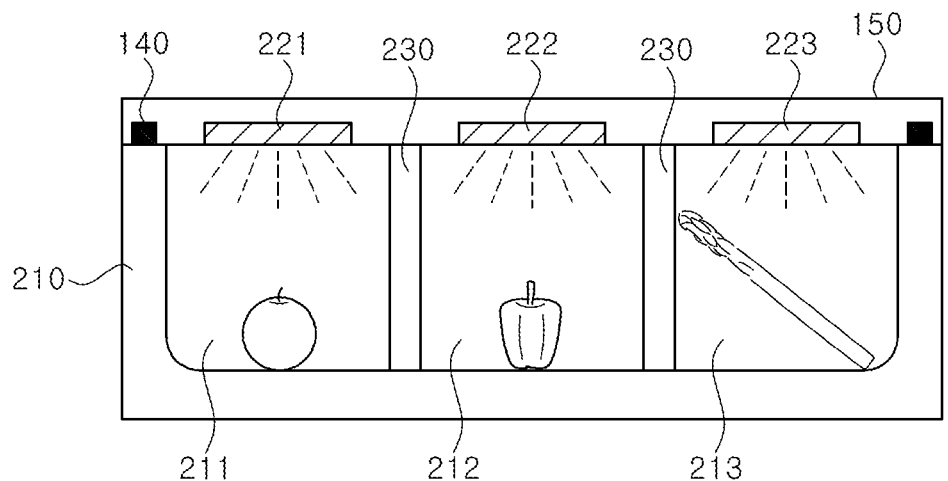
FIG. 15 and FIG. 16 are schematic views of a plant storage apparatus according to exemplary embodiments.
Figure 16:
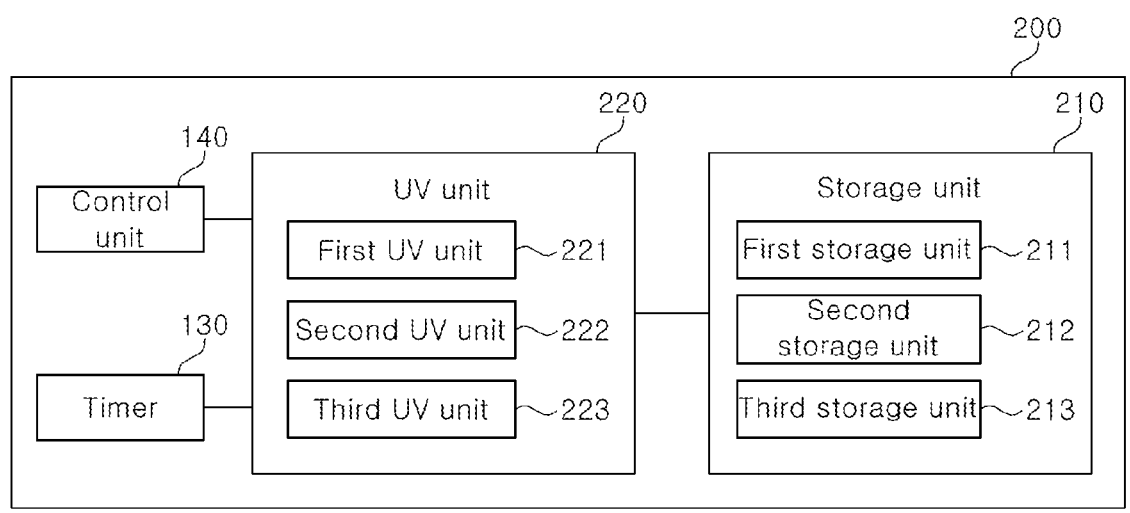

FIG. 15 and FIG. 16 are views of a plant storage apparatus according to another exemplary embodiment.

FIG. 15 is a schematic cross-sectional view of the plant storage apparatus according to an exemplary embodiment, and FIG. 16 is a block diagram of the plant storage apparatus according to an exemplary embodiment.

Referring to FIG. 15 and FIG. 16, the plant storage apparatus 200 includes a storage unit 210, a UV unit 220, a timer 130, a control unit 140, and a space partition 230.

The plant storage apparatus 200 may include substantially the same components as those of the plant storage apparatus 100 of FIG. 10, and thus, repeated descriptions thereof will be omitted to avoid redundancy.

The space partition 230 divides an inner space of the storage unit 210 into a plurality of separate spaces. For example, the space partition 230 may divide the storage unit 210 into a first storage unit 211, a second storage unit 212, and a third storage unit 213, each having an inner space. In particular, the first to third storage units 211, 212, 213 have respective separate inner spaces.

The UV unit 220 may individually emit UV light toward the first to third storage units 211, 212, 213. For example, the UV unit 220 may include a first UV unit 221, a second UV unit 222, and a third UV unit 223. The first UV unit 221 is provided to the first storage unit 211 and emits UV light toward the inner space of the first storage unit 211. The second UV unit 222 is provided to the second storage unit 212 and emits UV light toward the inner space of the second storage unit 212. The third UV unit 223 is provided to the third storage unit 213 and emits UV light toward the inner space of the third storage unit 213.

In this manner, the plant storage apparatus 200 may individually control UV radiation to the separate inner spaces of the storage unit 210. In addition, the plant storage apparatus 200 may allow UV light to be radiated only to an inner space in which plants are stored, and avoid emitting UV light to an inner space not storing plants.

Further, the timer 130 may control the first to third UV units 221, 222, 223 to emit UV light for different periods of time. In particular, the plant storage apparatus 200 may individually control the operation of the first to third UV units 221, 222, 223 depending on the type and duration of storage of plants stored in the storage unit 210.

Although the storage unit 210 is described as divided into three inner spaces by the space partition 230, the inventive concepts are not limited a particular number of inner spaces. In addition, the number of UV units 220 may also be varied depending on the number of separate inner spaces of the storage unit 210.

In this manner, the plant storage apparatus 200 according to an exemplary embodiment can provide different storage environments depending on plants stored in the respective storage units. As such, the intensity and duration of emission of UV light can be controlled depending on the state of plants stored in the respective storage units, thereby facilitating preservation of freshness of the plants and management of the phytochemical content of the plants.

According to exemplary embodiments, a plant storage apparatus provides an inner space by which plants may retain a higher phytochemical content that a just-harvested plant. However, the inventive concepts are not limited thereto. For example, a storage apparatus may be implemented as an illumination device including the UV unit 120. The illumination device may be installed on a shelf or stand for the storage or display of plants in some exemplary embodiments, and irradiate a harvested plant with UV light to allow the plant to retain more phytochemical contents than a harvested plant without irradiation with UV light.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art

What is claimed is:

1. A plant storage apparatus for higher retention of phytochemical content of a plant, comprising:
    a storage unit having an inner space for storing the plant;
    an ultraviolet (UV) unit provided to the storage unit and configured to emit UV light when the inner space is sealed; and
    a control unit configured to control operation of the UV unit such that the plant stored in the storage unit is irradiated with UV light for at least 6 hours to retain a higher phytochemical content than a plant not irradiated with UV light,
    wherein the storage unit is configured to maintain the inner space at room temperature for a first period including a period during which UV light is emitted, and to lower the temperature of the inner space for a second period longer than the first period.

2. The plant storage apparatus of claim 1, wherein the control unit is configured to control the UV unit to stop UV light radiation when the inner space of the storage unit is opened.

3. The plant storage apparatus of claim 1, further comprising a timer configured to control a duration of UV light radiation from the UV unit.

4. The plant storage apparatus of claim 1, wherein a phytochemical of the plant is resveratrol.

5. The plant storage apparatus of claim 1, wherein the phytochemical content including at least of one of glutathione and resveratrol of the plant irradiated with UV light is greater than that of a plant immediately after harvesting.

6. The plant storage apparatus of claim 5, wherein the phytochemical content of the plant irradiated with UV light is at least 80% of that of the plant immediately after harvesting.

7. The plant storage apparatus of claim 1, wherein the first period and the second period combined is greater than 1 day and less than 6 days.

8. The plant storage apparatus of claim 7, wherein the first period and the second period combined is 4 days.

9. The plant storage apparatus of claim 8, wherein the first period is 1 day and the second period is 3 days.

10. The plant storage apparatus of claim 1, further comprising a plurality of space partitions to divide the inner space into a plurality of isolated spaces,
    wherein the UV unit includes a plurality of UV lighting units configured to emit UV light to the isolated spaces, respectively.

11. The plant storage apparatus of claim 10, wherein at least one of the UV lighting units is configured to have a duration of UV light radiation different from those of the remaining UV lighting units.

12. A plant storage method for causing a plant to have a higher retention of phytochemical content, the method comprising:
    storing the plant at room temperature for a first period during which the plant is irradiated with ultraviolet (UV) light for at least 6 hours; and
    refrigerating the plant at a temperature lower than the room temperature for a second period longer than the first period, such that the plant has a higher phytochemical content than a plant not irradiated with UV light.

13. The plant storage method of claim 12, wherein a phytochemical of the plant is resveratrol.

14. The plant storage method of claim 12, wherein the phytochemical content of the plant irradiated with UV light is greater than that of a plant immediately after harvesting.

15. The plant storage method of claim 12, wherein the phytochemical content of the plant irradiated with UV light is at least 80% of that of the plant immediately after harvesting.

16. The plant storage method of claim 12, wherein the first period and the second period combined is greater than 1 day and less than 6 days.

17. The plant storage method of claim 16, wherein the first period and the second period combined is 4 days.

18. The plant storage method of claim 17, wherein the first period is 1 day and the second period is 3 days.

\* \* \* \* \*